US009707469B2

(12) United States Patent
Roland et al.

(10) Patent No.: US 9,707,469 B2
(45) Date of Patent: Jul. 18, 2017

(54) DOUBLE BARREL TRUCK MOUNTING ASSEMBLY

(71) Applicants: Christopher Daniel Roland, Leesburg, VA (US); James William Walker, Leesburg, VA (US)

(72) Inventors: Christopher Daniel Roland, Leesburg, VA (US); James William Walker, Leesburg, VA (US)

( * ) Notice: Subject to any disclaimer, the term of this patent is extended or adjusted under 35 U.S.C. 154(b) by 0 days.

(21) Appl. No.: 14/803,081

(22) Filed: Jul. 19, 2015

(65) Prior Publication Data

US 2017/0120137 A1   May 4, 2017

(51) Int. Cl.
*A63C 17/01* (2006.01)

(52) U.S. Cl.
CPC .......... *A63C 17/012* (2013.01); *A63C 17/017* (2013.01); *B60Y 2304/01* (2013.01)

(58) Field of Classification Search
CPC ..... A63C 17/01; A63C 17/011; A63C 17/012; A63C 17/017
See application file for complete search history.

(56) References Cited

U.S. PATENT DOCUMENTS

| 4,155,565 | A | * | 5/1979 | de Caussin | ........ | A63C 17/0046 280/11.19 |
| 5,050,252 | A | * | 9/1991 | Cuttriss | ................ | A47K 17/022 211/105.2 |
| 5,114,166 | A | * | 5/1992 | McCosker | ......... | A63C 17/0046 280/11.28 |
| 7,121,566 | B2 | * | 10/2006 | McClain | ............ | A63C 17/0093 280/11.28 |
| 7,140,621 | B2 | * | 11/2006 | Cheng | .................... | A63C 17/01 280/11.27 |
| 7,192,039 | B1 | * | 3/2007 | Snedaker | ........... | A63C 17/0093 280/87.021 |
| 7,255,356 | B2 | * | 8/2007 | Lin | .................... | A63C 17/0086 280/87.041 |
| 7,837,204 | B1 | * | 11/2010 | Groenenboom | ... | A63C 17/0093 280/11.27 |

(Continued)

*Primary Examiner* — Hau Phan
*Assistant Examiner* — Jacob Meyer (57) ABSTRACT

The Double Barrel Mounting Hardware invention is a hardware application for attaching skateboard trucks to the underside of a skateboard deck. The hardware is shaped like an elongated U (Harness) and mounts from the underside of the skateboard trucks through two corresponding holes on either the left or right side of the skateboard truck. The Double Barrel Mounting Hardware spans across these two corresponding holes in the skateboard truck along the underside of the skateboard truck baseplate and has two 90 degrees turned barrels at each end to pass through the holes in the skateboard truck baseplate and into the underside corresponding holes in the skateboard deck. The barrel of the harness that goes through the skateboard trucks and into the skateboard deck contains female threaded barrels. Male threaded mating bolts engage the harness barrels from the top side of the skateboard deck and when threaded together the mating bolt and harness bond the skateboard deck and skateboard trucks together. This hardware system securely attaches the skateboard trucks to the underside of the skateboard deck to be used in skateboard riding maneuvers.

1 Claim, 8 Drawing Sheets

(56) References Cited

U.S. PATENT DOCUMENTS

| | | | |
|---|---|---|---|
| 8,870,199 B2* | 10/2014 | Fehn | A63C 17/0046 |
| | | | 280/11.27 |
| 9,291,304 B1* | 3/2016 | Tu | F16M 13/02 |
| 9,421,917 B1* | 8/2016 | Christian | A62C 27/00 |
| 2006/0131824 A1* | 6/2006 | Hong | A63C 5/06 |
| | | | 280/14.27 |

* cited by examiner

DOUBLE BARREL TRUCK MOUNTING ASSEMBLY

(1) BACKGROUND OF INVENTION

1. Field of Invention

This invention relates to the methods of attaching the components of a skateboard together to make a useable device for skateboarding. More particularly it relates to the method of attaching the baseplate of the skateboard truck (the metal pivoting axle with wheels) to the underside of the skateboard deck.

2. Description of Related Art

The skateboard consists of 6 major components in its common application. These components are (1) skateboard deck, (2) griptape for the top of the skateboard deck, (3) skateboard trucks, (4) mounting hardware for combining the skateboard deck and skateboard trucks, (5) bearings that go on the skateboard truck axle, and (6) the wheels. A skateboard requires that the trucks be secured to the underside of the skateboard deck in order for the skateboard to be functional. The skateboard trucks commonly consist of a base plate, which is the piece of the skateboard truck that physically mounts to the underside of the skateboard deck. The baseplate has four holes, one located near each corner, that correspond with the holes in the skateboard deck.

A skateboard truck consists of several parts in its own design. The skateboard truck consists of a baseplate, axel, bushings, and a kingpin. The baseplate is rectangular in shape and flat on one side (the side that connects to the underside of the skateboard deck), and has two raised sections on the opposite side. In the flat portion of one truck there are 4 industry standard sized holes that correspond to the holes on the skateboard deck. Each hole is located near the corners of the rectangular shaped baseplate. One raised section houses a resilient pivot cup for the axle to rest in. The other raised section houses the kingpin. The kingpin passes through the underside of the baseplate and provides a threaded bolt to pass through the bushings and respective hole in the axle to connect the baseplate and axle together by threading and tightening a nut to the threaded end of the kingpin. The axle provides a durable structure for the bearings and wheels to be mounted to and extends wider than the baseplate to provide a more stable wheel base. The bushing are placed between the axle and the baseplate. These resilient and flexible bushings allow the axle to swivel on the fixed baseplate which allows the skateboard to maneuver from side to side when the rider's weight and/or foot placement is shifted on the deck of the skateboard.

In a typical skateboard application there are two sets of trucks, one located in the front section of the skateboard deck and one in the back section of the skateboard deck. The 4 corresponding holes in the baseplate of the truck are typically attached to the deck by 1 nut and bolt combination (traditional skateboard hardware) per hole. Typically there are 8 nut and bolt combinations in each full skateboard assembly.

A common issue with conventional truck mounting hardware is that the nut and bolt unthread/loosen over time, causing the need for continual tightening of the skateboard truck mounting hardware. The presence of a nut on the underside of the skateboard truck baseplate presents a physical element that can cause loosening during use. Bolts that extend past the nut can become bent which causes the need for the bolt to be cut in order to remove the skateboard truck mounting hardware. The Double Barrel Truck Mounting Hardware is designed to eliminate this unthreading/loosening issue. This design eliminates the physical element of a nut or bolt on the underside of the skateboard truck baseplate that can cause loosening and or snagging. The Double Barrel Truck Mounting Hardware design is also intended to make the installation of the mounting hardware easier. The installation only requires one tool on the top to fasten and tighten the skateboard truck to the skateboard deck versus common previous skateboard truck mounting hardware that requires a tool on the top of the deck and a secondary tool on the underside of the skateboard truck.

(2) SUMMARY OF INVENTION

The Double Barrel Mounting Hardware invention is a hardware application for attaching skateboard trucks to the underside of a skateboard deck. The harness of the hardware is shaped like an elongated U and mounts from the underside of the skateboard trucks through two corresponding holes each occurring on both the left and right side of the skateboard truck. The Double Barrel Mounting Hardware spans across these two corresponding holes in the skateboard truck along the underside of the skateboard truck baseplate and has two 90 degree turned barrels at each end to pass through the holes in the skateboard truck baseplate and into the underside corresponding holes in the skateboard deck. The barrel of the harness that goes through the skateboard trucks and into the skateboard deck contains female threaded barrels. Male threaded mating bolts engage the harness barrels from the top side of the skateboard deck and when threaded together the mating bolt and harness bond the skateboard deck and skateboard trucks together. This hardware system securely attaches the skateboard trucks to the underside of the skateboard deck to be used in skateboard riding maneuvers.

(3) DESCRIPTION OF DRAWINGS

The listed drawings illustrate this submitted invention to assist with the understanding of the descriptions of this document. These drawings include.

(4) DETAILED DESCRIPTION

Double Barrel Mounting Hardware

Figure 1:
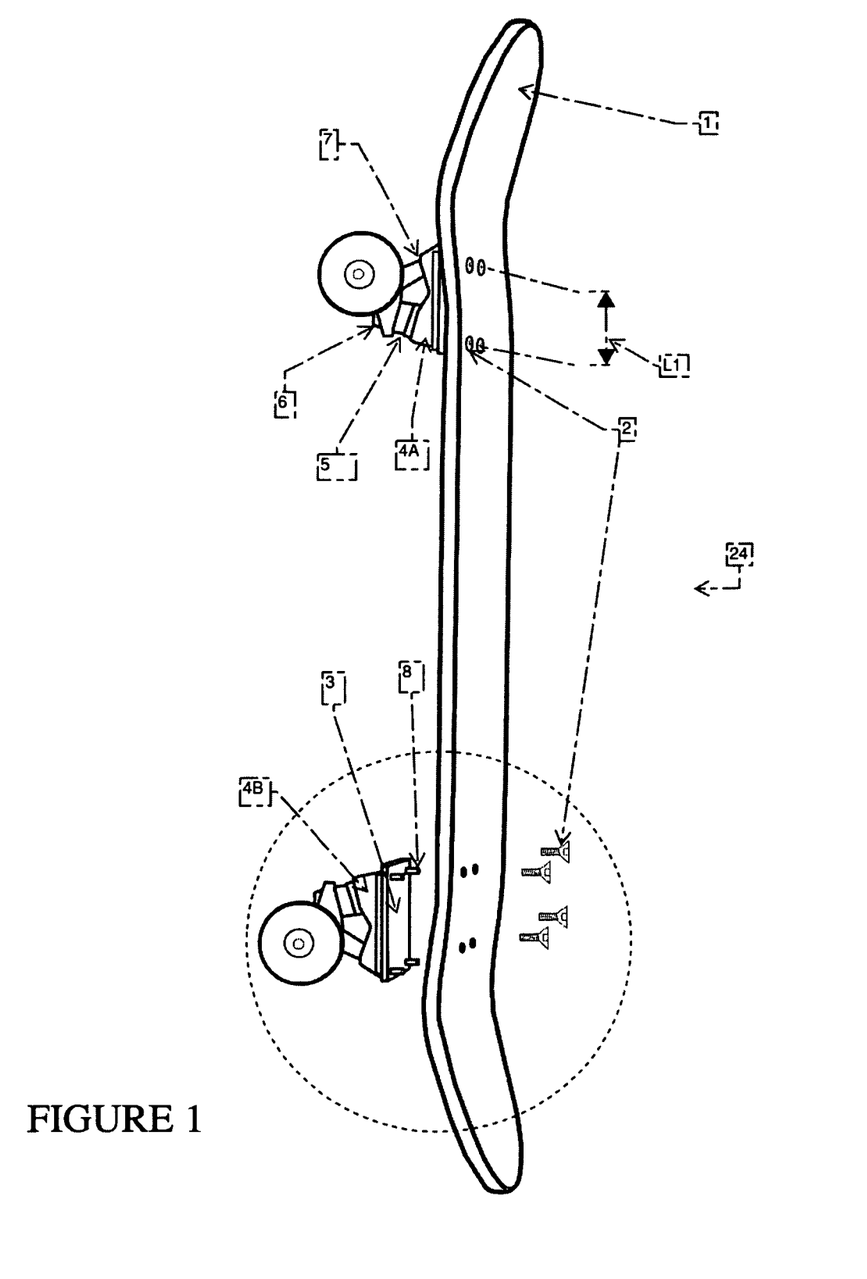
FIG. 1—Tilted side view of a complete skateboard assembly. Shown to include the skateboard deck, the skateboard trucks with wheels, and four Double Barrel Mounting Hardware Harnesses with the associated eight Mating Bolts FIG. 1A—Expanded side view of the back half of the skateboard. This view shows one skateboard truck with wheels, the skateboard deck, and the Double Barrel Mounting Hardware removed from the installed application. This view shows the path of installation for the Harness and Mating Bolts. It also shows the separate components of the skateboard and the proper positional alignment for the components to fit together for the use of a skateboard with the use of the Double Barrel Mounting Hardware system.

FIG. 1 is a complete view of a skateboard 24. The complete view consists of all the components that make up a skateboard. The skateboard consists of a skateboard deck 1 with two sets of trucks 4A and 4B attached to the underside of the skateboard deck 1. The skateboard deck and trucks are bonded together with four Double Barrel Mounting Hardware Harnesses (or simply harness) 8 and eight Double Barrel Mounting Hardware Mating Bolts (or simply bolts) 2. Each set of trucks requires two harnesses 8 and four bolts 2. The harnesses 8 are fed from the underside of the skateboard truck baseplate 3 through the holes in the skateboard truck baseplate 3 and into the corresponding skateboard deck 1 holes. The bolts 2 are then threaded down into the harnesses 8. Tightening the bolt 2 clockwise into the harness 8 pulls the harness upward and pulls the bolts 2 downward, tightly sandwiching the skateboard deck 1 and the truck baseplate 3 between the harnesses and bolts. The Double Barrel Mounting Hardware bonds the skateboard deck 1 and the skateboard trucks 4A and 4B tightly together for the intended purposes of the overall skateboard 24. The skateboard trucks are designed with a specific spacing on the skateboard deck 1 and vary based on the overall size of the skateboard deck 1. The skateboard trucks 4A and 4B are located toward the ends of the skateboard deck 1, and are referred to as the nose and the tail of the skateboard deck.

FIG. 1A is an expanded view of one end of the skateboard. The details of this view are typical on both sides/ends of the skateboard and the description for this expanded view is understood to be repeated and the same for the opposite side/end of the skateboard. FIG. 1A shows the Double Barrel Mounting Hardware in a non-assembled state to help depict all of the components from one another and also to help depict means of installation through the different components. The Double Barrel Mounting Hardware Harness (or simply harness) consists of the flat lower bar 9 and the two barrels 8. The barrels are open on the ends opposite of the flat lower bar and are female threaded (shown in later figures). The harness is designed with specific spacing between the barrels 8 (shown in later figures) to fit the industry standard hole spacing that is found in the truck baseplate 3 and also to the directly corresponding industry standard spaced holes of the skateboard deck 1. The barrels of one harness pass through the pre-drilled holes in the truck 23 and into the pre-drilled holes 22 of the skateboard deck 1. When installed, the flat connecting bar of the harness will be resting directly against the underside of the skateboard truck baseplate 3. The barrels of the harness will be seated securely in the pre-drilled holes of the skateboard truck baseplate 3 and skateboard deck 1 with the top of the harness barrel resting slightly under the surface of the skateboard deck 1, allowing for an area where the Double Barrel Mating Bolts (or simply mating bolt) can recess into the top side 25 surface of the skateboard deck 1. The design is for the head of the mating bolt 10 to be as flush as possible with the top/outermost layer of the griptape 11, which is attached to the top side of the skateboard deck 1. Once the harness is placed through the skateboard truck baseplate 3 and into the skateboard deck 1, the mating bolts are fed through the top side 25 of the skateboard deck 1 until they meet the open end of the barrel that is resting slightly under the surface of the skateboard deck 1. The mating bolt is then threaded in a clockwise direction using a slotted opening in the head of the mating bolt 10 (shown in later figures). The mating bolt is designed to be tightened by hand and/or a tool so the head of the mating bolt pulls the harness snugly against the underside of the skateboard truck baseplate 3 and tightened enough so that the tapered section of the mating bolt head 10 displaces/compresses the material of the skateboard deck to a point where the top of the mating bolt head 10 is as flush as possible with the top side of the griptape/deck 25. The harness does not require a tool to hold it in place while tightening the mating bolts and is absent from spinning freely while the mating bolt is being turned due to the barrel being held place by the skateboard truck baseplate 3 and the skateboard deck 1.

Figure 2:
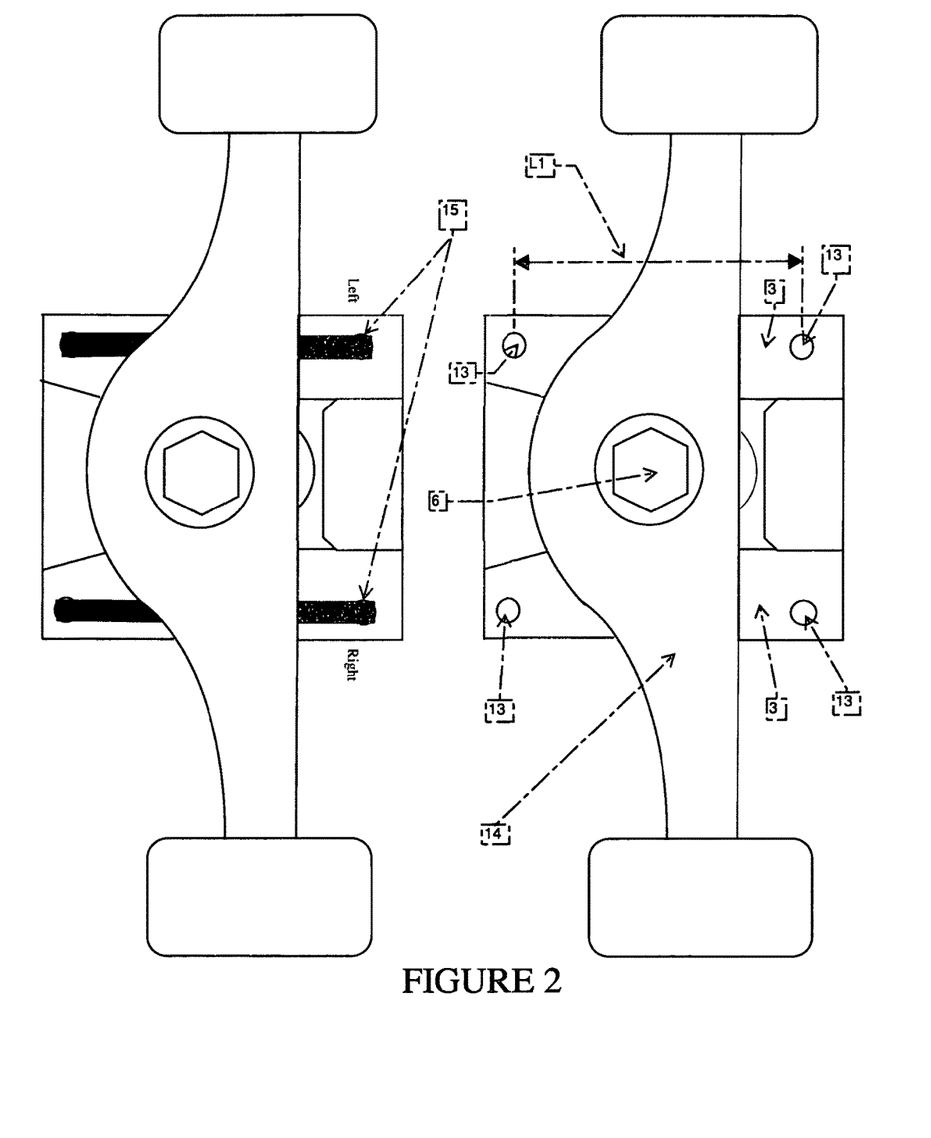
FIG. 2—The bottom view of two pairs of skateboard trucks. The right view shows the skateboard truck with the factory pre-drilled holes and their position on the skateboard truck baseplate. The left view shows the skateboard truck with the Double Barrel Mounting Hardware attached to the bottom of the skateboard truck baseplate.

FIG. 2 Shows two sets of skateboard trucks as if looking at the skateboard trucks from the underside of the skateboard. The right skateboard truck view shows the pre-drilled and industry standard holes 13 absent of the harness. The lower skateboard truck view shows the Double Barrel Mounting Hardware Harness placement 15 on the left and right side of the skateboard truck. The pre-drilled holes in the skateboard truck baseplate 3 are the passage ways for the harness barrels to pass through the skateboard truck and into the skateboard deck. The harness is designed to rest tightly against the skateboard truck baseplate 3, which is located under the skateboard truck axle 14. This is depicted in the left view. The barrels of the harness are specifically spaced L1 to fit into the pre-drilled holes of the skateboard truck baseplate 13. With both barrels of the harness passing through the skateboard truck baseplate, the harness is absent of the ability to spin or turn while performing skateboard riding maneuvers or while installing the mating bolts from the opposite side of the skateboard deck. Each truck consists of two Double Barrel Mounting Hardware Harnesses, one on each the left and right side 15 of the skateboard truck. The harness' lower flat bar is designed to have the lowest profile possible to avoid interference with the pivoting of the truck axle 14 and any interference with objects that may come in contact with the harness during the performance of skateboard riding maneuvers. Beyond the bottom surface of the lower bar of the harness there are no protruding nuts or bolts; which are common in traditional skateboard truck mounting hardware. The absence of protruding nuts or bolts provides for a more mechanically sound design. There are no nuts to catch on objects while riding the skateboard which can cause undesired unthreading of the nut from the bolt. There are also no protruding bolts to catch on objects while riding the skateboard which can cause the bolt end to bend. The absence of these protruding objects reduces catching on objects while performing skateboard riding maneuvers in general; which helps with performing desired skateboard riding maneuvers.

Figure 3:
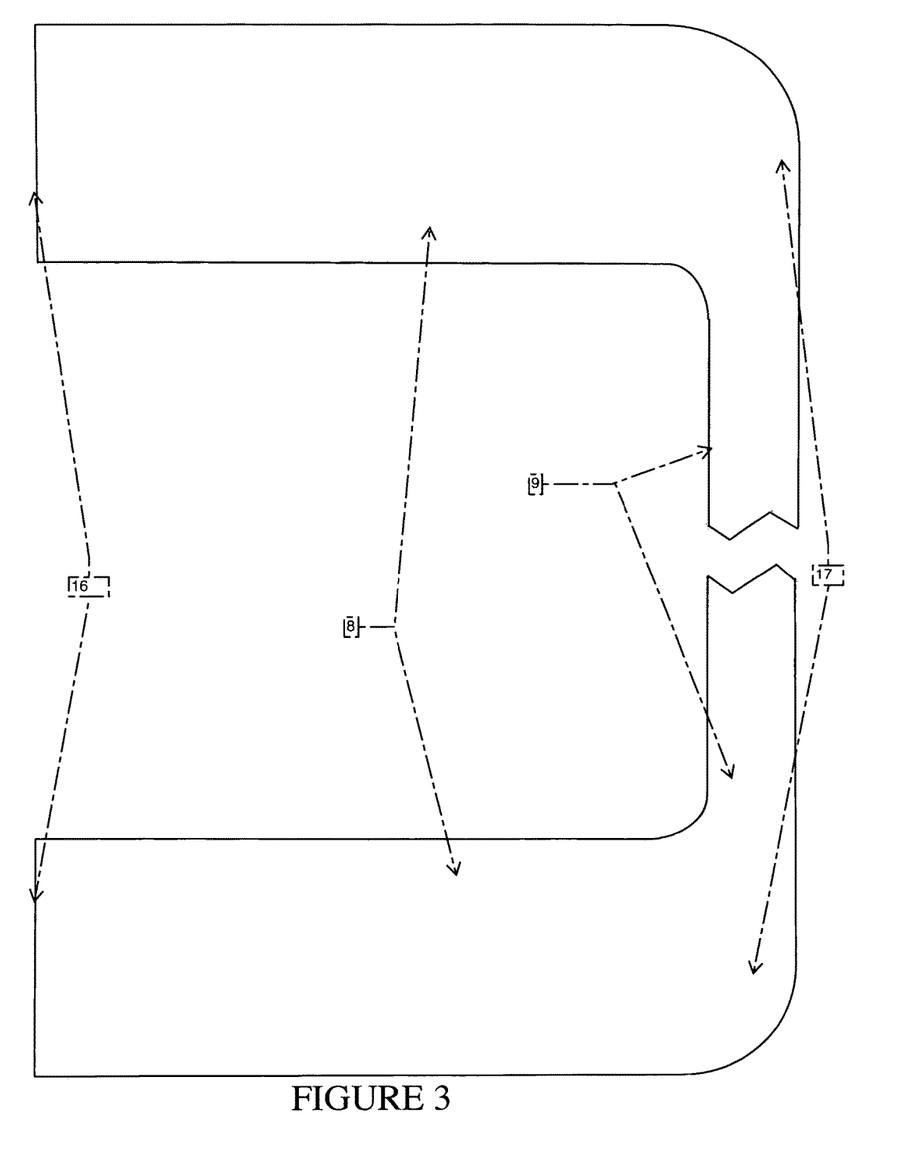
FIG. 3—Partial side view of the Double Barrel Mounting Hardware Harness. The center of the lower flat bar is cut out to allow focus on the barrels.

FIG. 3 Shows a side view of the Double Barrel Mounting Hardware Harness that focuses on the barrel of the harness with a removed section of the lower flat bar 9. The flat lower bar 9 of the harness connects the two barrels 8. The open side of the barrels 16 are the ends designed to accept the mating bolt. The closed sides of the barrels 17, which are also the back side of the flat lower bar 9 are designed with a flat and smooth finish for appearance and for functionality. The flat lower bar is designed to be as thin as possible (stated in FIG. 2) while maintaining the ability to serve its purpose as a secure spacer and anchor for the two barrels of the harness.

Figure 3A:
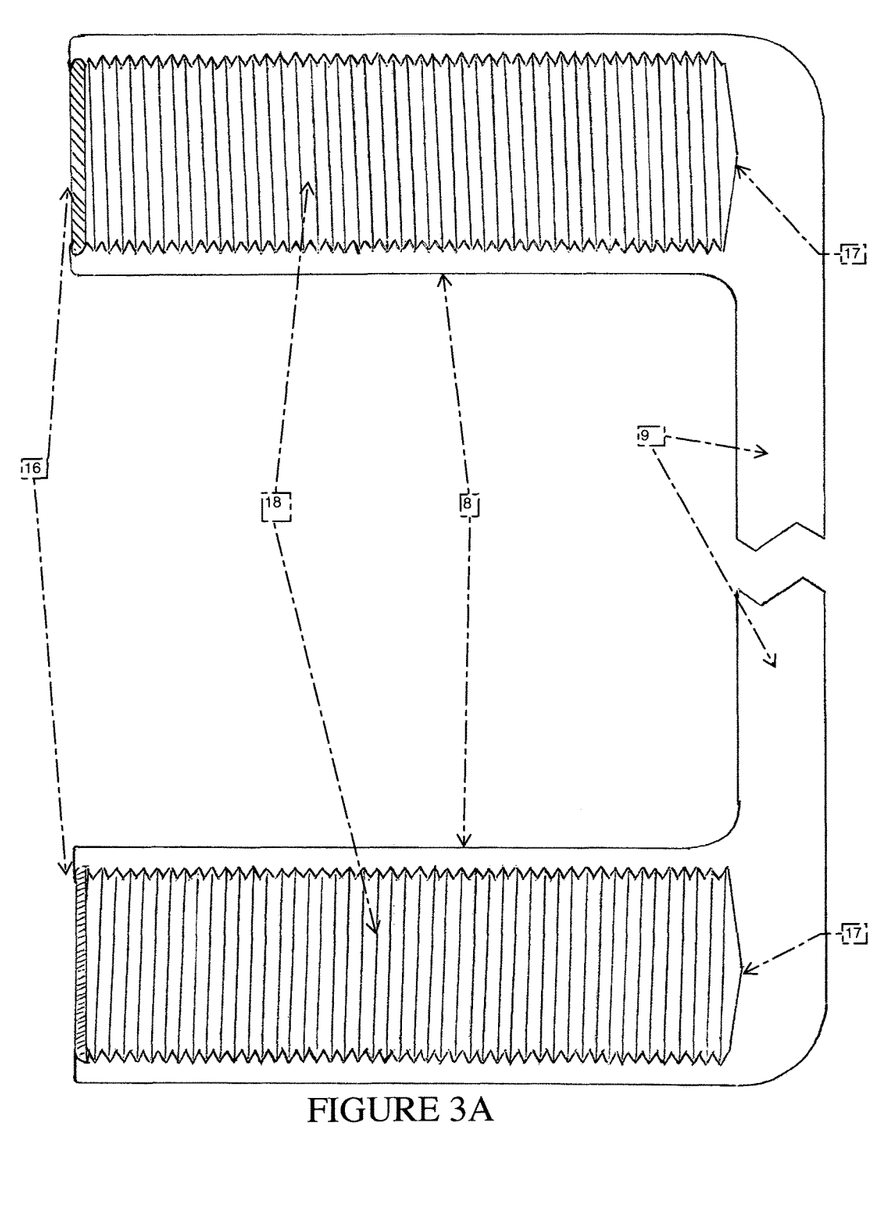
FIG. 3A—Cutaway partial side view of the Double Barrel Mounting Hardware Harness. This view shows the barrels of the harness with the internal female threading. It shows the relationship of the barrel terminal end and the lower flat bar.

FIG. 3A shows a cutaway side view of the Double Barrel Mounting Hardware Harness. This view helps show how the closed ends of the barrel's threading 18 are terminated at the closed end 17 prior to reaching the outer surface of the lower flat bar 9. The open ends 16 of the barrels are the beginning point for the female threading 18 that the mating bolts will thread into.

Figure 3B:
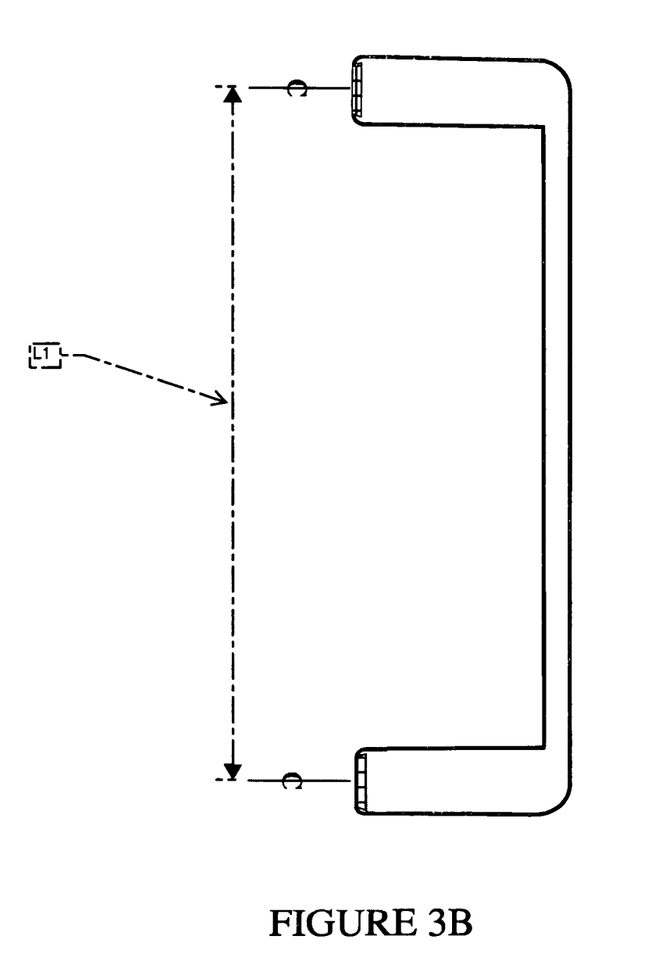
FIG. 3B—Side view of the complete Double Barrel Mounting Hardware Harness. This is a proportional view of the barrels and the lower flat bar components.

FIG. 3B Shows a complete side view of the Double Barrel Mounting Hardware Harness. L1 shows the dimension span of the center to center dimension of each barrel of the harness. These dimensions are set by the industry standard spacing of the skateboard truck baseplate holes and corresponding skateboard deck holes. FIG. 3B shows a proportional side view of the Double Barrel Mounting Hardware Harness.

Figure 3C:
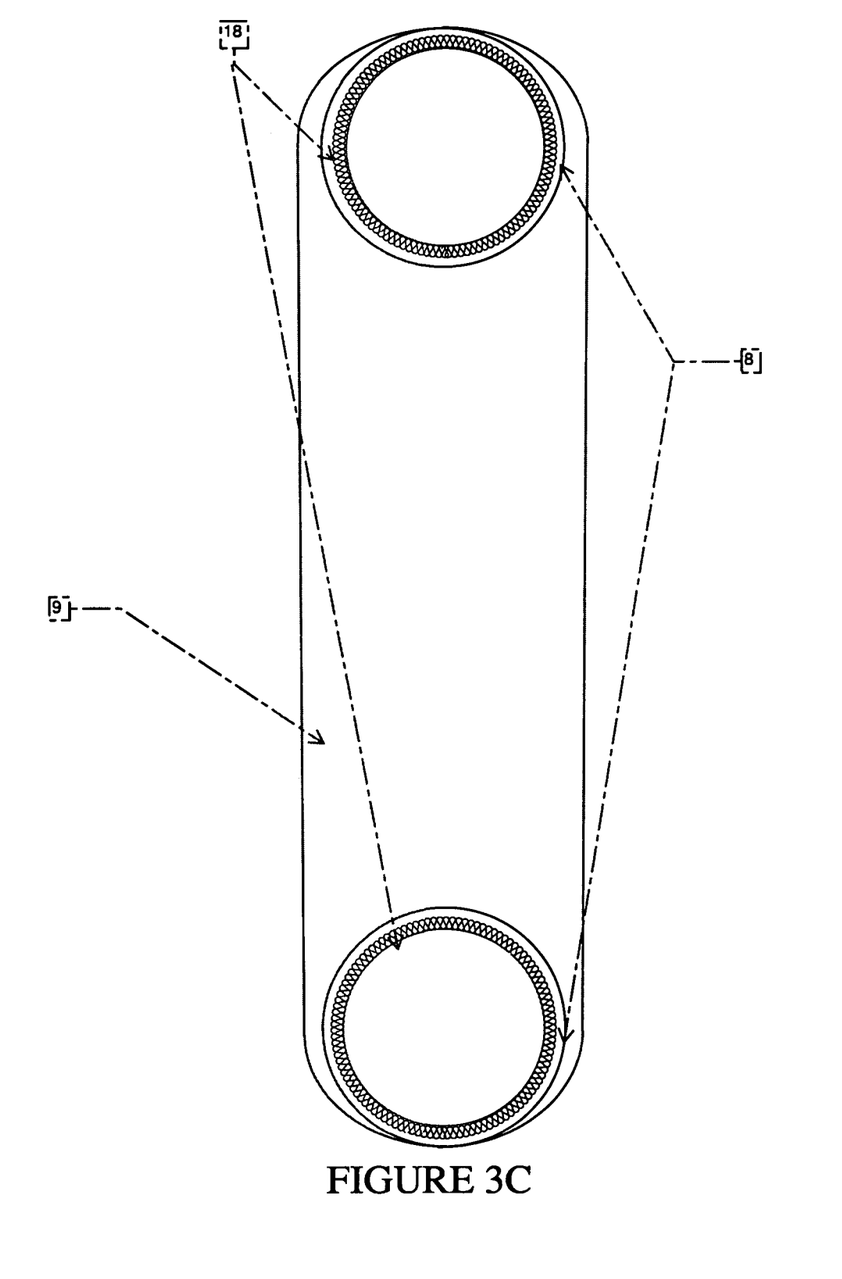
FIG. 3C—Top view of the Double Barrel Mounting Hardware Harness. This view shows a proportional relationship of the barrels and lower flat bar. This view also shows the sidewalls of the barrels, the threaded areas of the barrels, and the open space inside the barrels where the mating bolts thread into.

FIG. 3C Shows a top down view of the Double Barrel Mounting Hardware Harness looking into the open ends of the barrels 8. The barrel dimension is set to be slightly smaller than the holes in the skateboard truck baseplate. The dimension of the barrel is made for ease of installation, strength within the baseplate, and functionality with female threading 18 for accepting the mating bolt. The lower flat bar 9 serves as the connector between the two barrels 8 and keeps the harness seated tightly against the skateboard truck baseplate.

Figure 4:
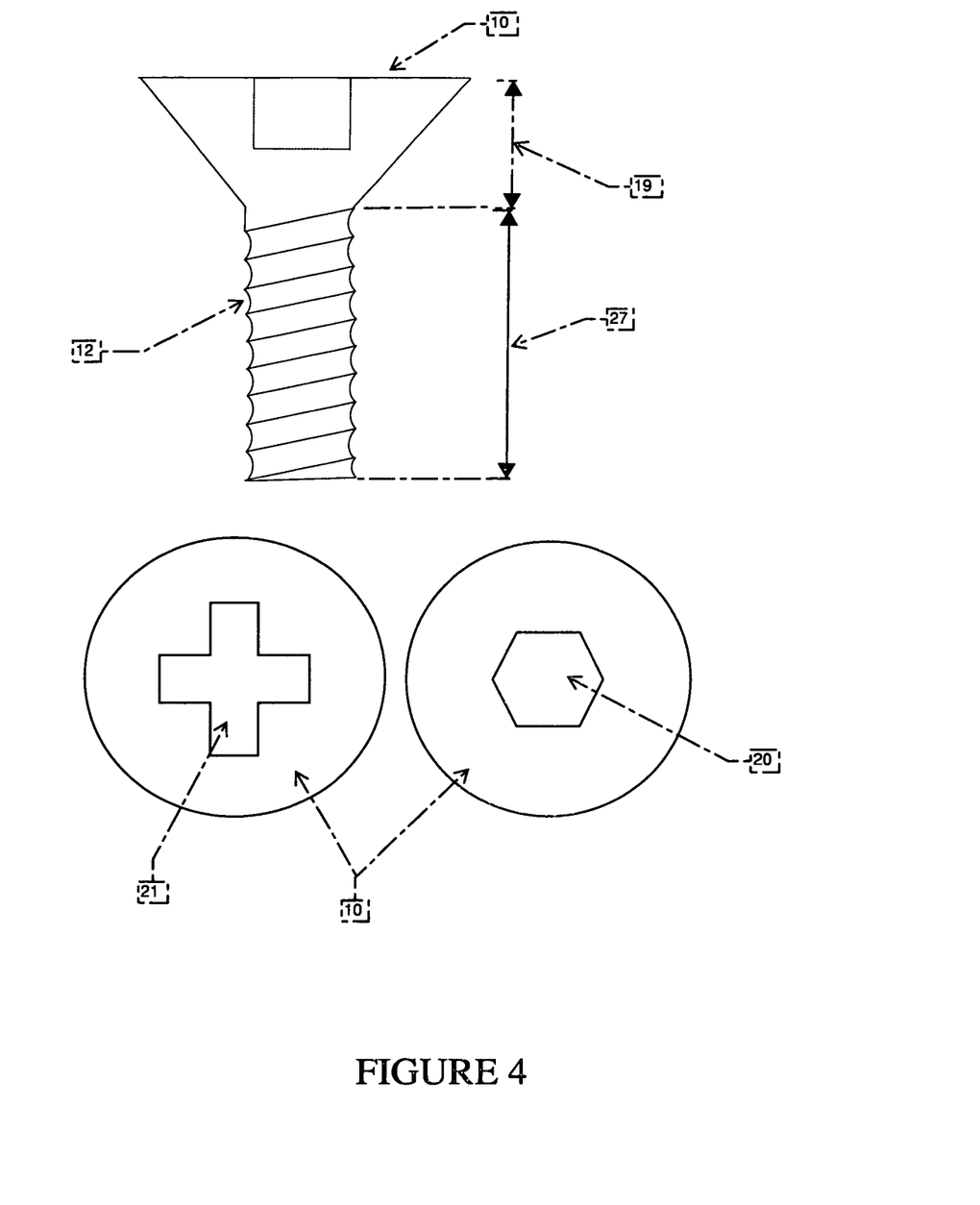
FIG. 4—Side view of the Double Barrel Mounting Hardware Mating Bolt and top views of the mating bolt heads. This view shows the tapered mating bolt head and threaded shaft of the mating bolt. It also shows examples of different types of tool bit slots that can be manufactured into the heads for installation purposes of the mating bolt into the barrel.

FIG. 4 Shows the Double Barrel Mounting Hardware Mating Bolt side view and top views of the heads of the mating bolts. The overall length of the mating bolt 19 & 27 is specifically designed to install inside the harness barrels without protruding on the top or bottom side of the skateboard deck or skateboard truck baseplate. The mating bolt head 10 is tapered 19 from the very top of the mating bolt to the point of the start of the male threading 12. This allows the mating bolt to compress and displace the material of the skateboard deck and countersink into the material so that the top of the mating bolt head 10 can sit flush with the upper most surface of the skateboard deck. The mating bolt's male threaded shaft 27 is designed with a specific thread count and spacing to match that of the female threaded harness barrels. The length of the mating bolt threaded shaft 27 is designed to be shorter than the barrel of the female threaded harness barrels. The shorter length of the mating bolt threaded shaft 27 avoids the mating bolt threaded shaft 27 from reaching a terminal point in the end of the harness barrel. The heads of the mating bolt 10 are designed to accept a tool for tightening. In the views shown the common tooling slots used will be a Philips slotted head 21 or the hex key/allen key slotted head 20. The head of the mating bolt 10 can be manufactured with a number of different tooling slots and should be noted for this design that any number of slots and combinations of slots can be used.

What is claimed is:

1. A method for fastening a skateboard truck to a mounting surface of a skateboard deck wherein two opposite surfaces of the skateboard deck have an equal number of corresponding holes that will accept a fastening device, the method comprising:

providing a pair of removable mating bolts each consisting of a tapered head and a threaded shaft; and providing a harness consisting of two female threaded barrels spaced apart and connected and sealed on the bottom end by a flat metal bar while open on the top end of the barrel, wherein each open end of the barrels passes through a corresponding hole in the skateboard truck and into the mounting surface of the skateboard deck to be engaged by the threaded mating bolt and tightened together by twisting the mating bolt to bond the components between harness and bolt;

fabricating the barrels of the harness to be of length so that they rest just below the skateboard deck surface;

fabricating the flat bar connecting the two barrels of the harness to have the smallest profile possible to avoid obstruction on the underside of the skateboard truck baseplate and in absence of any protruding nuts or bolts;

passing both harness barrels through the pre-drilled holes of the skateboard truck and into the pre-drilled corresponding holes on the underside of the skateboard deck, binding the barrels inside the pre-drilled holes to be free from spinning during installation of the mating bolts and only requiring one device on the head of the mating bolt for installation and free from unthreading from the underside of the skateboard truck baseplate during skateboard riding maneuvers;

threading the mating bolts into the top side of the skateboard deck pre-drilled holes and into the barrels of the harness until the two have bonded the skateboard deck and skateboard trucks together and the two are tightly joined.

* * * * *